(12) United States Patent
Oh et al.

(10) Patent No.: US 7,126,598 B2
(45) Date of Patent: Oct. 24, 2006

(54) 3D IMAGE SYNTHESIS FROM DEPTH ENCODED SOURCE VIEW

(75) Inventors: Teik Oh, Ardross (AU); Julien Flack, Swanbourne (AU); Philip Victor Harman, Scarborough (AU)

(73) Assignee: Dynamic Digital Depth Research PTY Ltd., Bentley (AU)

( * ) Notice: Subject to any disclaimer, the term of this patent is extended or adjusted under 35 U.S.C. 154(b) by 298 days.

(21) Appl. No.: 10/337,425

(22) Filed: Jan. 7, 2003

(65) Prior Publication Data

US 2004/0100464 A1    May 27, 2004

(30) Foreign Application Priority Data

Nov. 25, 2002    (AU)    .............. 2002952874

(51) Int. Cl.
*G06T 15/00*    (2006.01)
*G06T 15/40*    (2006.01)

(52) U.S. Cl. .................. 345/419; 345/422
(58) Field of Classification Search ............ 345/422
See application file for complete search history.

(56) References Cited

U.S. PATENT DOCUMENTS

| | | | | |
|---|---|---|---|---|
| 3,409,351 A | * | 11/1968 | Winnek | 353/7 |
| 5,208,872 A | * | 5/1993 | Fisher | 382/300 |
| 5,613,048 A | * | 3/1997 | Chen et al. | 345/419 |
| 5,615,287 A | * | 3/1997 | Fu et al. | 382/232 |
| 5,742,749 A | * | 4/1998 | Foran et al. | 345/426 |
| 5,754,707 A | * | 5/1998 | Knowlton | 382/254 |
| 5,852,673 A | * | 12/1998 | Young | 382/164 |
| 5,875,040 A | * | 2/1999 | Matraszek et al. | 358/453 |
| 5,953,014 A | * | 9/1999 | Wood | 345/422 |
| 6,038,348 A | * | 3/2000 | Carley | 382/268 |
| 6,064,424 A | | 5/2000 | van Berkel et al. | |
| 6,118,584 A | | 9/2000 | Van Berkel et al. | |
| 6,130,723 A | * | 10/2000 | Medin | 348/607 |
| 6,801,243 B1 | * | 10/2004 | Van Berkel | 348/59 |
| 6,816,158 B1 | * | 11/2004 | Lemelson et al. | 345/419 |
| 6,850,210 B1 | * | 2/2005 | Lipton et al. | 345/6 |
| 2002/0011969 A1 | * | 1/2002 | Lipton et al. | 345/8 |
| 2003/0026474 A1 | * | 2/2003 | Yano | 382/154 |

FOREIGN PATENT DOCUMENTS

| | | |
|---|---|---|
| AU | 714759 | 7/1997 |
| AU | 738692 | 6/1999 |
| WO | WO 01/56302 A1 | 8/2001 |

OTHER PUBLICATIONS

Van Berkel, "Image Preparation for 3D-LCD," IS&T/SPIE Conference on Stereoscopic Displays and Applications X, San Jose, California, Jan. 1999, SPIE vol. 3639.*

* cited by examiner

*Primary Examiner*—Ulka Chauhan
*Assistant Examiner*—Roberta Prendergast
(74) *Attorney, Agent, or Firm*—Banner & Witcoff, Ltd.

(57) ABSTRACT

A method of generating a synthesized 3D image from a source 2D image for display on a 3D display device including mapping a position on the display device to a fractional view number, and determining a source pixel of the 2D image to represent the said fractional view number, wherein the source pixel is determined as a function of the depth of a pixel at the position.

27 Claims, 3 Drawing Sheets

3D IMAGE SYNTHESIS FROM DEPTH ENCODED SOURCE VIEW

CROSS-REFERENCE TO RELATED APPLICATIONS

This application is based upon and claims the benefit of priority under 35 U.S.C. § 119 from the prior Australian Patent Application No. 2002952874, filed Nov. 25, 2002, the entire contents of which are incorporated herein by reference.

FIELD OF THE INVENTION

The present invention is directed towards an improved technique for the generation of images for use with autostereoscopic displays. In particular, the present invention relates to an improved method of producing images derived from a 2D image and associated depth map.

BACKGROUND OF THE INVENTION

A number of autostereoscopic displays are starting to appear on the market, some of which require multiple images in order to provide an autostereoscopic image, and enable the viewer to retain a stereoscopic effect despite movement of their head.

Such displays generally require images comprising a number of views created from a number of laterally displaced cameras. Such views can be originated from real cameras, generated using computer graphic image (CGI) techniques, or synthesized from a 2D image and an associated depth map.

The synthesis of multiple images from a 2D image and an associated depth map has previously been disclosed by the present Applicants in Australian patents AUS 714759 (10884/97) and AUS 738692 (16472/99) included here in full by reference.

In U.S. Pat. Nos. 6,118,584 and 6,064,424, included here in full by reference, van Berkel describes an autostereoscopic display that requires seven views. In German patent PCT WO 01/56302 A1, included here in full by reference, Grasnik describes an autostereoscopic display that requires eight views.

To those skilled in the art such displays are known to require multi-views or integer multi-views in order to display autostereoscopic images.

Given the commercial availability of such multi-view displays there is a corresponding requirement for suitable images or content.

There is thus a need for a more efficient technique for developing high quality images for multi-view autostereoscopic displays. Ideally the technique will be generic and can be applied to any display requiring multiple views (e.g. lenticular, parallax barrier, wavelength selective filter).

OBJECT OF THE INVENTION

It is therefore an object of the present invention to provide an improved method for the real time generation of images, suitable for use with multi-view autostereoscopic displays.

SUMMARY OF THE INVENTION

With the above object in mind the present invention provides a method of creating images suitable for use with a multi-view autostereoscopic display including the steps of:

1. A view calculation means for determining a fractional view for a given position of the synthesized 3D image.
2. A source pixel calculation means for relating the calculated view number to a position in the source image.
3. A weighted average means for calculating a source pixel value given a fractional source position.

In another aspect the present invention provides a method for generating a synthesized 3D image from a source image including the steps of:

determining a fractional view number for each pixel of a pixel array, and referring to a depth map of said source image to determine a location offset of each pixel.

DETAILED DESCRIPTION OF THE INVENTION

Whilst content can be obtained from a number of laterally displaced cameras this invention relates to the generation of images synthesized from a 2D image and an associated depth map.

In the preferred embodiment of the present invention the process of generating a synthesized 3D image includes two steps: namely the mapping of a position on the 3D display device to a fractional view number and the subsequent determination of a suitable source pixel to represent the said fractional view number.

Figure 1:
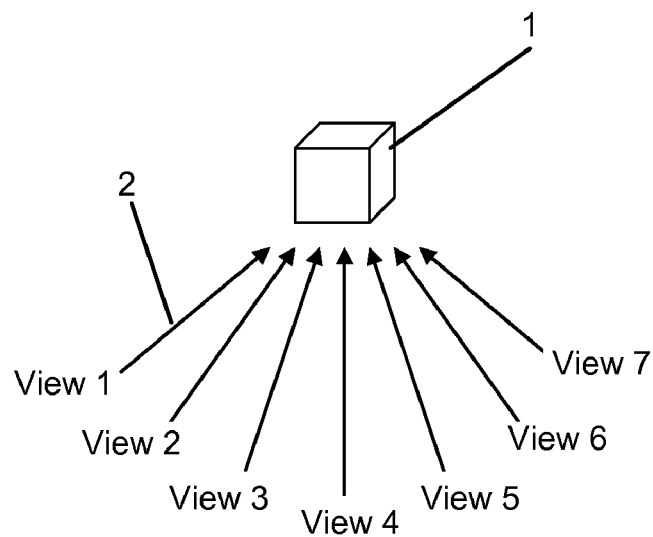
FIG. 1 illustrates the arrangement and number of views.
Figure 2:
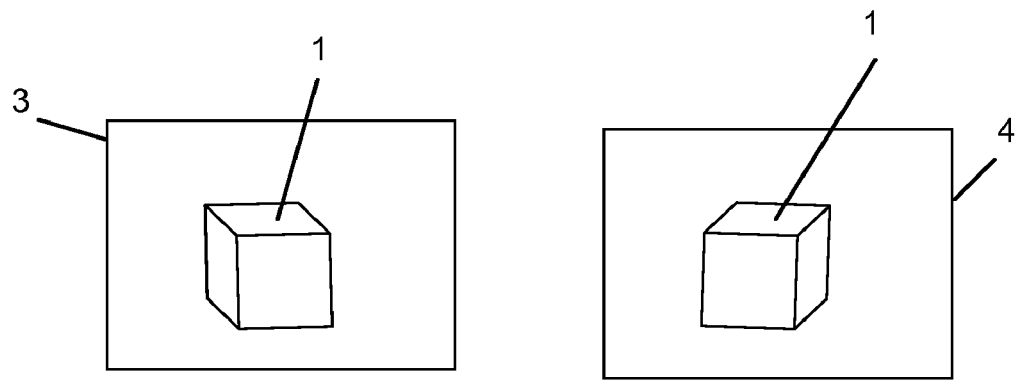
FIG. 2 illustrates the perspective shift between two example views.

A "view" may be defined as the projection of a 3D object or scene on to a 2D image. For the purposes of multiview displays views are generally converged on a point of focus and numbered from left to right as shown in FIG. 1. The optimal configuration of views depends on the characteristics of the screen and the contents of the scene. Each view is captured by some form of camera or capture device, whether physical or virtual. FIG. 2 illustrates two views of the object in FIG. 1—the shift in perspective effectively encodes the 3D structure of the scene.

An alternative definition of a view is to consider the angle between two cameras and a fixed point in the scene. For example, in FIG. 1 view 3 may be considered to be at an angle of 2 degrees from the front-on view 4. The present invention is not restricted to a fixed configuration of views but is able to generate arbitrary fractional views from a source view and an associated depth map (as described in the Applicants previous disclosure PCT/AU96/00820).

View Determination

Figure 3:
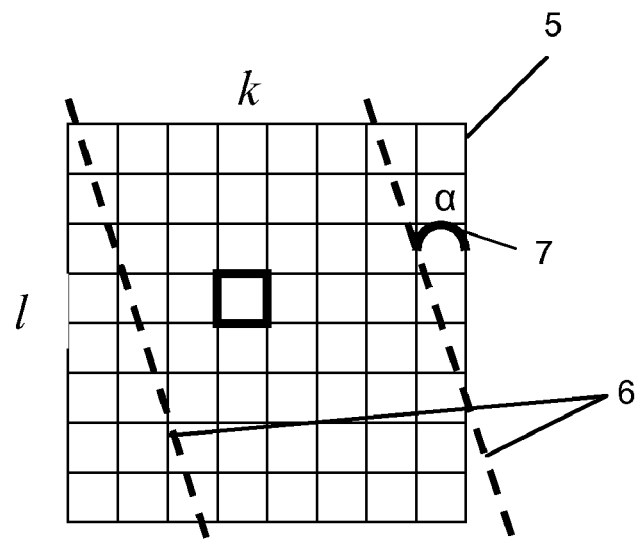
FIG. 3 illustrates part of the pixel array of the synthesized 3D image.

The first step of generating a synthesized 3D image involves determining a fractional view number for each pixel of the pixel array. FIG. 3 illustrates a small section 5 of a typical pixel array. The array 5 has a number of cells or pixels each containing a color and intensity value. Overlying the pixel array is an optical component 6 which may be arranged at an angle 7 α to the pixel array.

A generic formula for determining the source view for any given pixel of the array was previously described by Van Berkel as $$N = \frac{(k + k_{offset} - 3l\tan\alpha) \bmod X}{X} N_{tot}$$

where k is horizontal pixel index $k_{offset}$ is horizontal shift of the lenticular lens array relative to the pixel array α is angle of lenticular lens array relative to the pixel array X is the number of views per lenticule $N_{tot}$ is total number of views N is the view number of each sub pixel k,l Given characteristics of the screen such as the angle 7 between the lenticular and the pixel array α as well as the pitch of the lenticules a source view (N) can be calculated for any position (k,l) in the synthesized 3D image.

Although Van Berkel's formula describes view determination for lenticular displays it may also be applied to parallax barrier systems. The barrier will simply obscure some views. Similarly, the formula may also be applied to wavelength selective filter arrays in which case some views will be filtered. Further although van Berkel teaches taking the nearest integer view (N) for the actual mapping the fractional result from the formula may be used directly.

In practice, the optical component overlying the pixel array gives rise to a repeating pattern which maps view numbers to the pixel array. This pattern can be represented as a mask, which is repeatedly applied. This leads to a gain in efficiency as van Berkel's formula only needs to be calculated once for each mask element.

View Generation

Once a fractional view, N, has been calculated for a given k,l position in the pixel array of the synthesized 3D image the present invention provides an inventive means for generating a pixel for the required view. This approach uses a depth map to determine a location offset of the pixel in a single source view. This offset effectively simulates a perspective transformation by introducing parallax.

Figure 4:
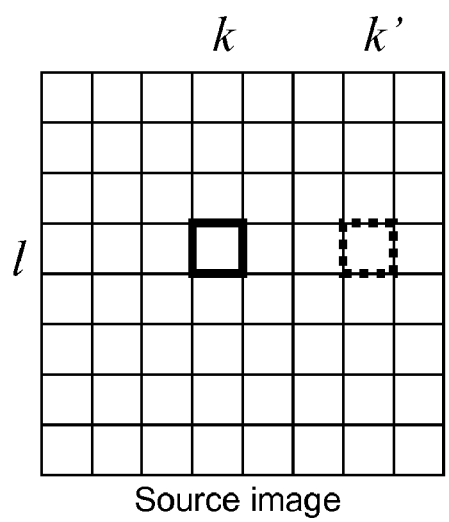
FIG. 4 illustrates the pixel array of the source view corresponding to the synthesized 3D image.
Figure 5:
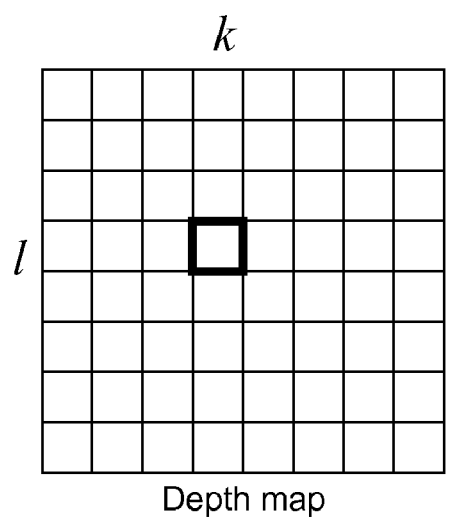
FIG. 5 illustrates the value array of the depth map corresponding to the source view.

FIG. 4 illustrates the pixels 8 of the source view corresponding to the synthesized pixel array in FIG. 3. Similarly, FIG. 5 illustrates an array of depth values 9 corresponding to the pixels of the source view. To calculate the position of the pixel in the source view corresponding to the required view, N the following formula is used:

$$k' = k + 3(Z_{k,l} P_{shift}(N) P_{strength} - P_{offset})$$

where:

$Z_{k,l}$ is the depth at position k,l (which varies between 0 and 1)

$P_{shift}(N)$ is a function relating the view N to a parallax shift (−1 . . . 1)

$P_{strength}$ controls the total parallax strength $P_{offset}$ is used to control the parallax offset (or false parallax)

The function describing the relationship between a view N and the associated parallax shift $P_{shift}(N)$ depends on the optical characteristics of the 3D screen in question.

Figure 6:
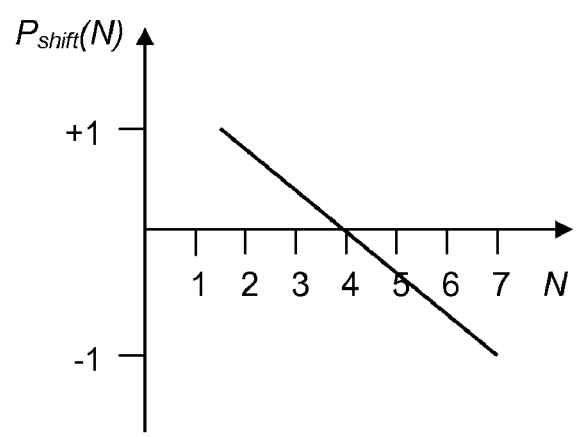
FIG. 6 illustrates an example mapping between the pixel shift and the view number.

FIG. 6 shows a realistic example of the $P_{shift}(N)$ function for a seven view display. With reference to FIG. 1 it is apparent that the shift is greater at the extreme views (1 and 7) than in the central view (4). It should be noted that this formulation can be used to relate shift to fractional views. For example, in FIG. 3 view 3.127 can be related to a shift of approximately 0.25. In practice the $P_{shift}(N)$ function may not be linear—for example it may be desired to reduce the amount of shift towards the extreme views.

The calculated position k', l' may not be an integer, in which case the nearest position may be used. Alternatively, the nearest integer source pixels may be averaged using a weighted average calculation. As an alternative to weighted average calculation, any statistic of the closest pixels to k' may be calculated.

The current invention improves on the prior art by removing the need to completely generate multiple views and is therefore significantly more efficient.

For example, when synthesizing a 3D image using nine views the 3D image only contains ⅑ of each view—the remaining 8/9 are discarded. With the direct source and depth synthesis technique we only generate the ⅑ of each view we require, effectively reducing the amount of calculations required by nine. In general, for display with N views the current invention requires N times less calculations than the prior art.

A further aspect of the current invention improves on the prior art by providing a mechanism for generating arbitrary fractional views. The prior art teaches the generation of a synthesized 3D image from a number of fixed views. The said views, are fixed at the point they are captured by a physical or virtual camera. The present invention includes a view generation means, which enables arbitrary views to be generated during image synthesis. This provides improved flexibility as the same data can be used to configure the views for any multiview 3D display.

The current invention improves on the prior art by providing a more efficient means for synthesizing a 3D image. Traditionally, a 3D image is synthesized by first generating the required number of complete views and then subsampling these views to form a composite 3D image. For example, in an autostereoscopic display requiring 24 views, 24 individual images would have to be generated requiring significant computation and memory resources. The current invention avoids the need for generating these views by synthesizing the image directly using a single view and a depth map.

Figure 7:
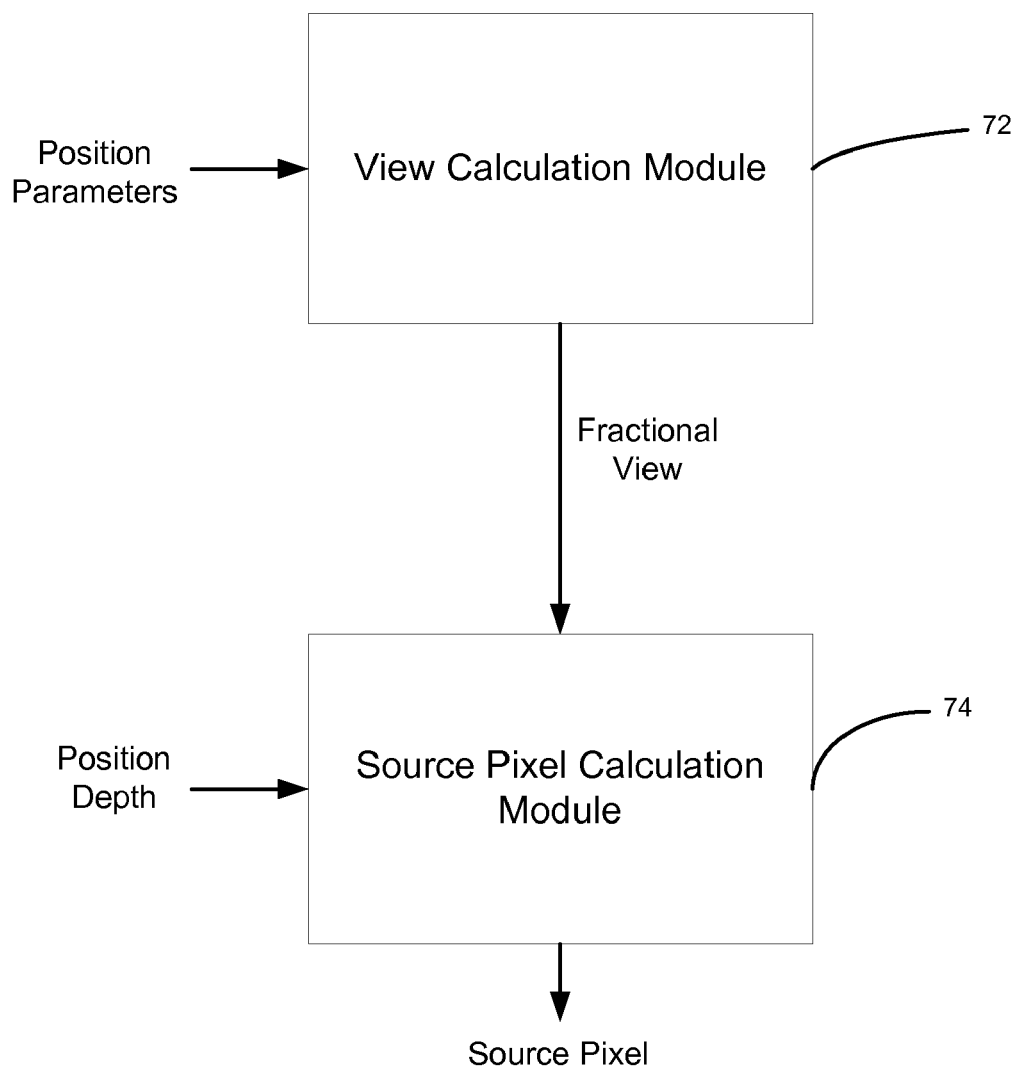
FIG. 7 provides a block diagram of an example of modules, which may be used in an illustrative implementation of the present invention.

An illustrative system for creating images suitable for display on a multi-view autostereoscopic display device is shown in FIG. 7. A view calculation module 72 receives position parameters and determines a fractional view for a given position on the display device. Then a source pixel calculation module 74 maps a source pixel to the position as a function of a depth of the pixel at the position and the fractional view at the position. The fractional view number can be determined by the above described formula for the view number N and the source pixel can be determined by the above formula for k'.

Whilst the method and apparatus of the present invention has been summarized and explained by illustrative application it will be appreciated by those skilled in the art that many widely varying embodiments and applications arc within the teaching and scope of the present invention, and that the examples presented herein are by way of illustration only and should not be construed as limiting the scope of this invention.

The invention claimed is:

1. A method of generating a synthesized 3D image from a source 2D image for display on a 3D display device including:
    mapping a position on said display device to a fractional view number, wherein the fractional view number is a non-integer value; and
    determining a source pixel of said 2D image to represent said fractional view number;
    wherein said source pixel is determined as a function of a depth of a pixel at said position; and mapping said source pixel to said position to generate said synthesized 3D image.

2. The method as claimed in claim 1, wherein mapping said position to said fractional view number is determined by:

$$N = \frac{(k + k_{offset} - 3l\tan\alpha) \bmod X}{X} N_{tot}$$

where k is a horizontal pixel index and l is a vertical pixel index
    $k_{offset}$ is a horizontal shift of a lenticular lens array relative to a pixel array
    $\alpha$ is an angle of the lenticular lens array relative to the pixel array
    X is a number of views per lenticule
    $N_{tot}$ is a total number of views
    N is a view number of each sub pixel k,l.

3. The method as claimed in claim 1, wherein said source pixel is determined by:

$$k' = k + 3(Z_{k,l} P_{shift}(N) P_{strength} - P_{offset})$$

where:
    $Z_{k,l}$ is the depth at position k,l
    $P_{shift}(N)$ is a function relating the view N to a parallax shift
    $P_{strength}$ controls the total parallax strength
    $P_{offset}$ is used to control a parallax offset.

4. The method as claimed in claim 1, wherein said determining said source pixel includes using the nearest integer position to a calculated position.

5. The method as claimed in claim 1, wherein said determining said source pixel includes taking a weighted average pixel value from pixels closest to a calculated position within a single fractional view.

6. The method as claimed in claim 3, wherein k' is rounded to the nearest integer value.

7. The method as claimed in claim 3, wherein a weighted average of pixels closest to k' is calculated.

8. A method of generating a 3D image for display on a multi-view autostereoscopic display device including:
    receiving a source 2D image and depth map;
    determining a fractional view number for a position on said display device, wherein the fractional view number is a non-integer value; and
    determining a source pixel for display at said position as a function of said fractional view number and a depth assigned to an original pixel located at said position on said source 2D; and mapping said source pixel to said position to generate said 3D image.

9. The method as claimed in claim 8, wherein said fractional view number is determined by:

$$N = \frac{(k + k_{offset} - 3l\tan\alpha) \bmod X}{X} N_{tot}$$

where k is a horizontal pixel index and l is a vertical pixel index
    $k_{offset}$ is a horizontal shift of a lenticular lens array relative to a pixel array
    $\alpha$ is an angle of the lenticular lens array relative to the pixel array
    X is a number of views per lenticule
    $N_{tot}$ is a total number of views
    N is a view number of each sub pixel k,l.

10. The method as claimed in claim 9, wherein said source pixel is determined by:

$$k' = k + 3(Z_{k,l} P_{shift}(N) P_{strength} - P_{offset})$$

where:
    $Z_{k,l}$ is the depth at position k,l
    $P_{shift}(N)$ is a function relating the view N to a parallax shift
    $P_{strength}$ controls a total parallax strength
    $P_{offset}$ is used to control a parallax offset.

11. The method as claimed in claim 10, wherein k' is rounded to the nearest integer value.

12. The method as claimed in claim 10, wherein a weighted average of pixels closest to k' is calculated.

13. A method of generating a synthesized 3D image for display on a 3D display device including:
    receiving a source 2D image, depth map, and a fractional view array;
    for a position on said display device, determining an offset location for a pixel based on said depth map and a fractional view number from the fractional view array, wherein the fractional view number is a non-integer value; and
    mapping a pixel at said offset location to said position to generate said synthesized 3D image.

14. The method as claimed in claim 13, wherein said offset location is determined by:

$$k' = k + 3(Z_{k,l} P_{shift}(N) P_{strength} - P_{offset})$$

where:
    $Z_{k,l}$ is a depth at position k,l
    $P_{shift}(N)$ is a function relating a view N to a parallax shift
    $P_{strength}$ controls a total parallax strength
    $P_{offset}$ is used to control a parallax offset.

15. The method as claimed in claim 13, wherein said determining said offset location includes using the nearest integer position to a calculated position.

16. The method as claimed in claim 13, wherein said determining said offset location includes taking a weighted average pixel value from pixels closest to a calculated position within a single fractional view.

17. The method as claimed in claim 14, wherein k' is rounded to the nearest integer value.

18. The method as claimed in claim 14, wherein a weighted average of pixels closest to k' is calculated.

19. A system for creating images suitable for display on a multi-view autostereoscopic display device including:

a view calculation means to determine a fractional view number for a given position on said display device, wherein the fractional view number is a non-integer value;

a source pixel calculation means for mapping a source pixel to said position as a function of a depth of a pixel at said position and said fractional view number at said position.

20. The system as claimed in claim 19, wherein said view calculation means determines said fractional view number by:

$$N = \frac{(k + k_{offset} - 3l\tan\alpha) \bmod X}{X} N_{tot}$$

where k is a horizontal pixel index and l is a vertical pixel index $k_{offset}$ is a horizontal shift of a lenticular lens array relative to a pixel array $\alpha$ is an angle of the lenticular lens array relative to the pixel array X is a number of views per lenticule $N_{tot}$ is q total number of views N is a view number of each sub pixel k,l.

21. The system as claimed in claim 19, wherein said source pixel calculation means determines said source pixel by:

$$k' = k + 3(Z_{k,l} P_{shift}(N) P_{strength} - P_{offset})$$

where:

$Z_{k,l}$ is the depth at position k,l $P_{shift}(N)$ is a function relating a view N to a parallax shift $P_{strength}$ controls a total parallax strength $P_{offset}$ is used to control a parallax offset.

22. The system as claimed in claim 21, wherein k' is rounded to the nearest integer value.

23. The system as claimed in claim 21, wherein a weighted average of pixels closest to k' is calculated.

24. The system as claimed in claim 21, wherein a statistic of pixels closest to K' is calculated.

25. A method as claimed in claim 3, wherein a statistic of pixels closest to K' is calculated.

26. The method as claimed in claim 10, wherein a statistic of pixels closest to K' is calculated.

27. The method as claimed in claim 14, wherein a statistic of pixels closest to K' is calculated.

* * * * *

UNITED STATES PATENT AND TRADEMARK OFFICE
CERTIFICATE OF CORRECTION

PATENT NO.         : 7,126,598 B2                                      Page 1 of 1
APPLICATION NO.    : 10/337425
DATED              : October 24, 2006
INVENTOR(S)        : Teik Oh et al.

It is certified that error appears in the above-identified patent and that said Letters Patent is hereby corrected as shown below:

In the Claims; Claim 8; Column 5; Line 66:
    Please replace "source 2D;" with --source 2D image;--

Signed and Sealed this

Thirteenth Day of March, 2007

JON W. DUDAS
*Director of the United States Patent and Trademark Office*